United States Patent [19]

Ferguson et al.

[11] Patent Number: 5,422,973

[45] Date of Patent: Jun. 6, 1995

[54] WATER BLOCKED UNFILLED SINGLE TUBE CABLE

[75] Inventors: Stephen T. Ferguson, Morganton; Larry W. Field, Hickory, both of N.C.

[73] Assignee: Siecor Corporation, Hickory, N.C.

[21] Appl. No.: 218,168

[22] Filed: Mar. 28, 1994

[51] Int. Cl.[6] .............................................. G02B 6/44
[52] U.S. Cl. .................................................... 385/112
[58] Field of Search ................................. 385/100–114

[56] References Cited

U.S. PATENT DOCUMENTS

| | | | |
|---|---|---|---|
| 4,703,998 | 11/1987 | Uchioke et al. | 350/96.23 |
| 4,711,523 | 12/1987 | Iri et al. | 385/112 |
| 4,815,813 | 3/1989 | Arroyo et al. | 350/96.23 |
| 5,013,127 | 5/1991 | Bernard | 385/107 |
| 5,133,034 | 7/1992 | Arroyo et al. | 385/107 |

FOREIGN PATENT DOCUMENTS 61-166506  7/1986  Japan ........................... 385/112

Primary Examiner—Rodney B. Bovernick
Assistant Examiner—John Ngo

[57] ABSTRACT

Disclosed is a dry single tube fiber optic cable of the loose tube variety in which there is no filling or flooding materials but none the less adequate provisions are made to protect the optical fibers from damage due to water penetration. The cable structure comprises (1) one or more groups of optical fibers each held together by a circumscribing water absorbent material; (2) a buffering tube having an internal channel larger than the one or more groups of optical fibers in which the groups of optical fibers are moveably disposed; (3) a strength member circumscribing the buffering tube; (4) a water absorbent material circumscribing the strength member, and (5) a jacket circumscribing the strength member.

10 Claims, 1 Drawing Sheet

WATER BLOCKED UNFILLED SINGLE TUBE CABLE

BACKGROUND

This invention relates to a unfilled single loose tube fiber optic cable in which no filling or flooding compounds are used; yet, the optical fibers are protected from penetrating water by a unique positioning of water absorbing yarn or tape.

Most fiber optic cable of the loose tube variety employ a filling material inside of the buffer tube and flooding material between the buffer tube and a jacket which circumscribes the buffer tube. The purpose of the flooding and filling compounds is to shield the optical fibers from water. Such is a "wet" construction because both the flooding and filling material have respective viscosities that can and do wet a given surface. A water impervious unfilled loose tube fiber optic cable is desirable because the fibers are more easily accessible and more environmental acceptable because the filling and flooding compounds would be eliminated. Yet, the optical fibers within the buffer tube would be protected against water. Worldwide there is a growing need to recycle plastic and other materials. Plastic cables containing flooding or filling compounds are not subject to recycling because of the flooding and filling compounds. Existing landfills are beginning to object to anything that has flooding or filling compounds, thus the desirability of a unfilled cable which would be recyclable and/or non objectionable for landfill disposal. It is towards the solution to this problem the present invention is directed.

BRIEF DESCRIPTION OF THE INVENTION

The present invention is a multi optical fiber single loose tube cable comprising the following elements:

One or more groups of optical fibers, each of which are held together in a bundle configuration by a circumscribing water absorbent yarn or tape. A buffering tube having an internal channel larger than the one or more groups of optical fibers in which one or more groups of optical fibers are moveably disposed. A strength member circumscribes the buffering tube. A water absorbent material such as a yarn or tape circumscribes the strength member; and, a jacket circumscribes the strength member.

DETAILED DESCRIPTION OF THE INVENTION

Figure 1:
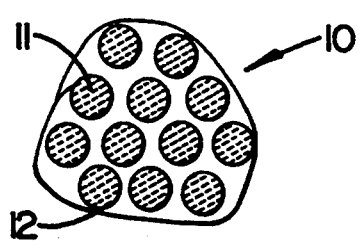
FIG. 1 is a cross sectional view of a group of optical fibers circumscribed by a water absorbent yarn or tape to form a bundle.
Figure 2:
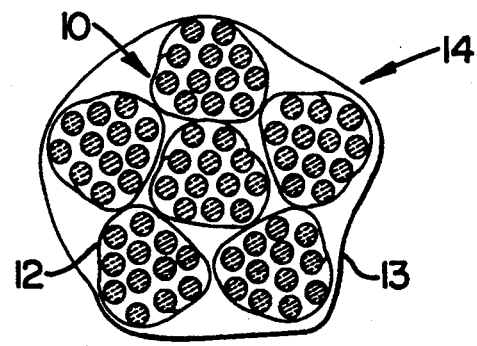
FIG. 2 is a cross sectional view of a plurality of bundled optical fiber groups of FIG. 1 bundled together and circumscribed by a water absorbent yarn or tape.

In FIG. 1, there is shown by element 10 a bundle of optical fibers 11 circumscribed by a water absorbent yarn or tape 12. The yarn or tape usually is of a predetermined color, making fibers 11 easier to identify for splicing and other purposes. In FIG. 2, there is shown a plurality of optical fiber groups 10 associated into a bundle 14, which is held together by still another water absorbent yarn or tape 13, which may have a predetermined color. Water absorbent yarn or tape can be procured from Lantor Corporation of Atlanta, Georgia and the optical fibers from Corning Incorporated, Corning, N.Y.

Figure 3:
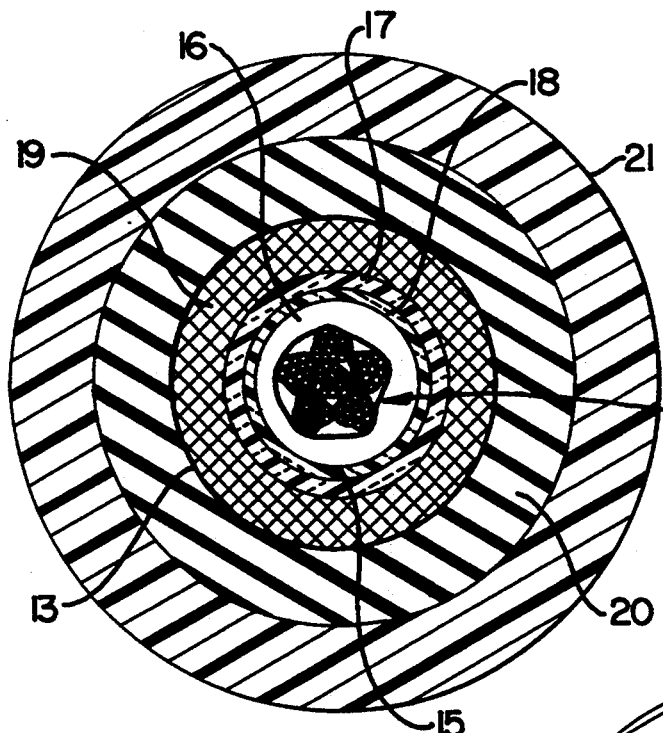
FIG. 3 is a cross sectional view of one cable embodiment of the invention employing the bundles of FIG. 2 and an armor shield; and, FIG. 4 is a cross sectional view of an all dielectric cable embodiment of the invention employing all dielectric materials and the optical fiber bundles of FIG. 2.

In FIG. 3 there is shown a non dielectric cable embodiment employing the bundle 14 of FIG. 2. Plastic buffer tube 15 is provided. In some cases it may have a single or a multi layer sidewall like that of elements 17 and 18. Buffer tube 15 is of such relative dimensions that its channel 16 of a size that bundle or bundles (not shown) 14 are loosely disposed and movable therein. Bundles 14 may be longitudinally longer than buffer tube 15 to provide for extra length to accommodate strain and movement. In addition, buffer tube 15 may have an inner layer 17 made from thermoplastic material and the outer layer 18 composed of cross-linked plastic, e.g., thermosetting plastic.

Surrounding buffer tube 15 is strength member 19, which can be made from fiberglass and/or aramid yarn. Surrounding strength member 19 is a water absorbent material such as a tape or yarn and surrounding element 19 is an armor 20, made from steel or other suitable metal. Surrounding armor 20 is a jacket 21 made from polyethylene, polyvinyl chloride and/or polypropylene.

Figure 4:
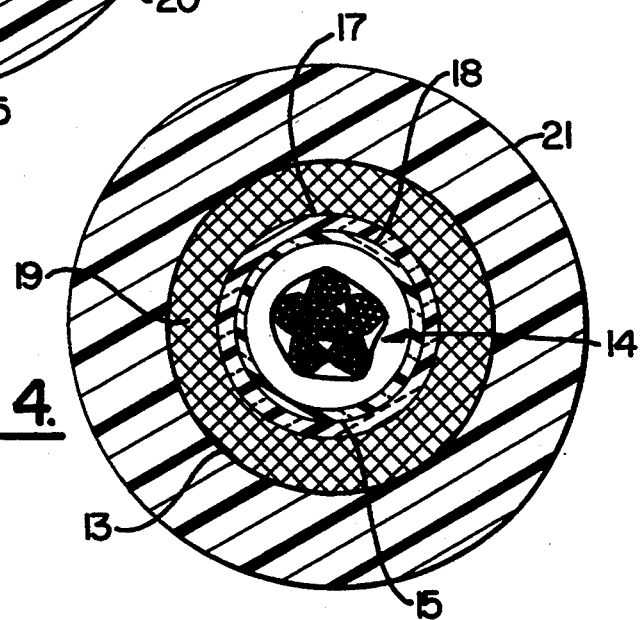

In FIG. 4 there is shown an all dielectric cable embodiment, which has the same structure as the cable embodiment of FIG. 3 except that the armor 20 is deleted. The bundles 10 may be S-Z stranded or stranded in the conventional helical manner. If there are more than one groups like element 14, such groups can be either helical or S-Z stranded.

The following claims are intended to cover the specific embodiments disclosed herein as well as modifications, variations, and equivalents.

What is claimed is:

1. An optical fiber loose tube cable, comprising:
    (a) one or more groups of optical fibers, each group held together by a circumscribing first water absorbing material;
    (b) a buffering tube having a predetermined longitudinal length and an interior channel larger than the one or more groups of optical fibers, with said one or more groups of optical fibers and said first water absorbing material loosely disposed in said buffering tube;
    (c) a strength member circumscribing said buffering tube;
    (d) a second water absorbent material circumscribing said strength member; and,
    (e) a jacket circumscribing said strength member.

2. The cable of claim 1 further comprising an armor tape circumscribing said second water absorbing material.

3. The cable of claim 1 wherein said one or more of said groups of optical fibers are held together by a colored water absorbent material.

4. The cable of claim 1 wherein all materials of said cable are dielectric.

5. The cable of claim 1 wherein each group of said one or more groups of optical fibers are circumscribed by a water absorbent material having a predetermined color.

6. The cable of claim 1 wherein said strength member is constructed from fiberglass or aramid yarn.

7. The cable of claim 3 wherein two or more groups of optical fibers are S-Z stranded.

8. The cable of claim 1 wherein said two or more groups of optical fibers have a longitudinal length greater than the longitudinal length of said buffering tube.

9. The cable of claim 5 wherein said two or more groups of optical fibers are S-Z stranded.

10. The cable of claim 5 wherein said one or more groups of optical fibers have a longitudinal length greater than the longitudinal length of said buffer tube.

* * * * *